United States Patent [19]

Huang et al.

[11] Patent Number: 5,895,525

[45] Date of Patent: Apr. 20, 1999

[54] RAPID SETTING CEMENTITIOUS COMPOSITIONS AND METHOD

[75] Inventors: Lan Huang, Cleveland; Stephen A. Farrington, Chardon, both of Ohio

[73] Assignee: MBT Holding AG, Zurich, Switzerland

[21] Appl. No.: 08/919,886

[22] Filed: Aug. 28, 1997

Related U.S. Application Data

[63] Continuation of application No. 08/629,797, Apr. 9, 1996, abandoned, which is a continuation of application No. 08/309,373, Sep. 20, 1994, abandoned.

[51] Int. Cl.$^6$ .................................................. C04B 24/04
[52] U.S. Cl. ..................... 106/696; 106/724; 106/728; 106/819; 106/823
[58] Field of Search .......................... 106/724, 823, 106/728, 819, 802, 696

[56] References Cited

U.S. PATENT DOCUMENTS

| | | | |
|---|---|---|---|
| 3,600,203 | 8/1971 | Aldera . | |
| 3,656,985 | 4/1972 | Bonnel et al. | 106/90 |
| 3,826,665 | 7/1974 | Decines et al. | 106/104 |
| 3,856,541 | 12/1974 | Martin | 106/90 |
| 3,973,978 | 8/1976 | Nakagawa et al. | 106/696 |
| 4,082,561 | 4/1978 | Nakagawa et al. | 106/819 |
| 4,084,981 | 4/1978 | Higuchi et al. | 106/96 |
| 4,264,367 | 4/1981 | Schutz | 106/90 |
| 4,357,167 | 11/1982 | Kellet et al. | 106/694 |
| 4,670,055 | 6/1987 | Koslowski | 106/695 |
| 4,804,563 | 2/1989 | Hillemeier . | |
| 5,223,036 | 6/1993 | Koyata et al. | 106/724 |
| 5,269,845 | 12/1993 | Grunau et al. . | |
| 5,273,579 | 12/1993 | Tanaka et al. | 106/785 |
| 5,340,612 | 8/1994 | Perito . | |
| 5,350,450 | 9/1994 | Hamabe et al. | 106/802 |
| 5,356,671 | 10/1994 | Drs . | |
| 5,378,277 | 1/1995 | Caron | 106/606 |

FOREIGN PATENT DOCUMENTS

| | | |
|---|---|---|
| 2684096 | 5/1993 | France . |
| 54-001733 | 8/1979 | Japan . |
| 4150433 | 11/1979 | Japan . |
| 0104952 | 8/1980 | Japan . |
| 359062689 | 4/1984 | Japan . |
| 359084974 | 5/1984 | Japan . |
| 0108352 | 6/1985 | Japan . |
| 0151289 | 8/1985 | Japan . |
| 01257156 | 10/1989 | Japan . |
| 1522501 | 8/1978 | United Kingdom . |
| 1522502 | 8/1978 | United Kingdom . |
| 2033367 | 5/1980 | United Kingdom . |
| 1575450 | 9/1980 | United Kingdom . |
| 2240334 | 7/1991 | United Kingdom . |

OTHER PUBLICATIONS

Chemical Abstract No. CA 84(12):787–66h abstracting JP 50143816, *Hardening Acceleration for Cement Product*, Hideo Suzuki et al. (1975).

JPO & JAPIO Abstract No. 03107744 abstracting JP 0 2083244 A, *Dry Spraying Method*, Sato Teruyuki et al. (1990).

Japanese Patent Abstract—"Hot Shotcrete and Hot Shotcrete Technique", Kawauchi et al., JP 02–97449 (Apr. 10, 1990).

Japanese Patent Abstract—"Soil Stabilizer Composition", Nishimura et al., JP 60–55076 (Mar. 29, 1985).

Japanese Patent Abstract—"Grout", Itou et al., JP 59–120681 (Jun. 12, 1984).

Japanese Patent Abstract—"Soil Stabilizer", Sugananuma et al., JP 59–62689 (Apr. 10, 1984).

Japanese Patent Abstract—"Soil Stabilizer Composition", Nishimura et al., JP 59–84973 (May 16, 1984).

Japanese Patent Abstract—"Soil Stabilizer Composition", Nishimura et al., JP 59–84974 (May 16, 1984).

*Primary Examiner*—Paul Marcantoni
*Attorney, Agent, or Firm*—Renner, Kenner, Greive, Bobak, Taylor & Weber.

[57] ABSTRACT

Rapid setting cementitious compositions comprise hydraulic cement and at least 4% by weight based on the weight of the cement of a water-soluble malate or citramalate such as an alkali metal malate or alkali metal citramalate.

13 Claims, No Drawings

RAPID SETTING CEMENTITIOUS COMPOSITIONS AND METHOD

This is a continuation of application Ser. No. 08/629,797 filed Apr. 09, 1996, now abandoned which is a continuation of application Ser. No. 08/309,373, filed Sep. 20, 1994 now abandoned.

The present invention relates to rapid setting cement compositions and more particularly to the use of certain chemicals as quick-setting agents in formulating such compositions.

Rapid setting cement compositions are desirable and widely used materials, particularly in applications known as lining and relining construction where a continuous layer of modest thickness of a cement composition is applied to a surface. A common procedure in which rapid setting cement compositions are used is well-known as shotcreting. In all such usages, the cement composition must set quickly in order to retain its position as applied.

The particular quick-setting agent used in rapid-setting cement compositions will influence a number of performance criteria of interest to the industry. Not only must the agent effect a rapid setting within certain time limits, but the rapid setting is desirably achieved with economically attractive amounts of a quick-setting agent. In addition, the rapid development of strength properties, which does not arise simply because of the rapid setting, is an important performance criteria of a quick-setting agent. The ability to continue early strength development to a high final strength is also a desirable objective.

Quick-setting agents have been traditionally strongly alkaline solutions of silicates and aluminates. The aluminates tend to be better than the silicates in providing early strength development, but the aluminates are also caustic. The caustic nature of both the silicates and aluminates has raised both health and environmental concerns.

It is an objective in the cement art to provide alternatives to current quick-setting agents and particularly to provide quick-setting agents which provide rapid early strength development and it would be desirable to have non-caustic agents with such strength development and other desired properties.

In accordance with the invention, it has been found that water soluble salts of malic acid (hydroxybutanedioc acid) and citramalic acid (2-hydroxy-2-methylbutanedioc acid), in particular alkali metal salts, are especially useful as quick-setting agents in cementitious compositions.

The invention therefore provides in one major aspect thereof rapid-setting cementitious compositions comprising hydraulic cement and at least 4% by weight of the cement of a water soluble salt of malic or citramalic acid or mixture thereof. These compositions will be applied in admixture with sufficient water for hydraulic setting of the cement. Both very quick setting and rapid and good strength development are obtained with the invention.

In another embodiment the compositions of the present invention consist essentially of hydraulic cement and at least 4% by weight of the cement of a water soluble salt of malic or citramalic acid or mixture thereof.

A salt of malic acid or citramalic acid for purposes of this invention is defined as a malic acid or citramalic acid molecule with both of their acid groups in salt form, i.e. to provide the disalt forms. The preferred water-soluble salt forms are the alkali metal salt forms, particularly the sodium, potassium and lithium salt forms. The particularly preferred quick-setting agents are disodium malate, disodium citramalate, dipotassium malate and dipotassium citramalate, and mixtures thereof, with dipotassium malate or dipotassium citramalate being most preferred. However, lithium salts may be preferred where the alkali-silica reaction is a concern since it is well known that lithium salts inhibit the alkali-silica reaction.

The malic and citramalic acid salts used in the invention are added to the cementitious compositions in their salt forms which are generally commercially available. If not commercially available, the salts may be produced from the commercially available acids. The neutralized acids are generally added to the cementitious compositions as aqueous solutions. To achieve the maximum accelerating effect, a solution of the neutralized acid in the mixing water should be added to a mixture of the dry components (cement, aggregate, silica fume, etc.).

In general, at least 4% by weight of water soluble malate based on the weight of the hydraulic cement is required to attain the quick-setting action possessed by these agents. When a malate is employed in amounts of 4% or more, they will rapidly accelerate the setting of the cement. Substantially greater amounts up to 20% by weight or more may be employed depending upon the final formulation, objectives and conditions of use. Desirably, at least 5% water soluble malate or citramalate based on the weight of the cement is employed with amounts greater than 10% being unnecessary in most applications. Preferably, the amount of malate or citramalate is in the range of 5.0 to 8.5%, more usually 5.5 to 8.0%, based on the weight of the hydraulic cement.

In general, the water soluble malates and citramalates, depending largely on the amount employed, can be used to provide quick-setting as desired in a variety of applications. Hence, an initial setting time of not greater than 20 minutes by ASTM Method C266 can be readily achieved. Setting times in the range of 10 seconds to 5 minutes, preferably 30 seconds to 5 minutes, as common in shotcreting applications, are easily targeted by the addition of water soluble malates or citramalates in accord with the invention.

The hydraulic cement employed in the compositions of the invention is a commercially produced calcium-aluminosilicate mineral blend, which when mixed with water will set to form a hard product. The most common type of hydraulic cement is portland cement, i.e. types I–IV portland cement, and for purposes of the present invention, portland cement is the preferred hydraulic cement.

In addition to cement, the compositions of the invention may include other ingredients commonly present in quick-setting cement compositions and other cement additives which do not substantially interfere with the quick-setting ability of the compositions of the invention.

A common ingredient of quick-setting cement composition is aggregate, especially fine aggregate such as sand and the like. Pea gravel aggregates (maximum diameter of 0.375 inch) and the like may also be used in shotcrete applications with suitable nozzles. Course aggregates may also be used in quick-setting applications. In typical applications the amount of aggregate, e.g. fine aggregate such as silica sand, will be present in a weight ratio to the cement of from 0.5:1 to 6:1, more usually from 1.2:1 to 5:1, and particularly from 1.5 to 4.5. Lighter weight aggregates such as perlite and the like may also be used.

A variety of other materials not classed as aggregates may also be included. Examples are silica fume, silicones and fibers such as glass and steel fibers. Agents to provide cohesion or bonding of the applied cement composition, such as polyvinyl alcohols, may also be included.

The amount of water to be included in the quick-setting compositions of the invention will vary depending upon the particular application and other known factors, but is always sufficient for the hydraulic setting of the cement component. The amount of water used in shotcrete application is usually controlled to avoid undesired fluidity. Hence, the amount of water in shotcrete compositions will usually vary from 20% to 60%, more usually 30% to 45%, by weight of the hydraulic cement component. Since the water soluble malates and citramalates have been found to have a solids dispersing effect, the amount of water may be less than that otherwise indicated for particular applications. In other applications, greater amounts of water than used in shotcreting may be employed to provide desired fluidity. Other cement additives to maintain fluidity may also be used but in general the compositions will achieve a rapid initial set in not greater than 20 minutes, preferably no more than 15 minutes under the influence of the water soluble malates or citramalates when employed in amounts of 4% by weight of the cement or greater.

The rapid-setting compositions and method of the invention is particularly useful in shotcrete applications.

Shotcreting can be carried out using a dry mix cement composition (the dry mix system) or a wet mix cement composition (the wet mix system), as described below.

a) The dry mix system is one in which dry mixed cement and aggregate is pneumatically conveyed through a delivery hose and is applied by projecting it out from the nozzle under pressure; water and a quick setting agent being added in the vicinity of the nozzle, generally upstream of the nozzle, just prior to passage into the nozzle. With this system it is difficult to control the quantity of water added and therefore to control the water-cement ratio (hereinafter referred to as the W/C ratio). Further, dust is generated and this is a drawback. Alternatively the quick setting agent can be added at the point of mixing instead of vicinal to the nozzle.

b) The wet mix system is a system in which the cement and aggregate are mixed in the presence of water and the mixture pumped through a delivery hose to a nozzle and then projected pneumatically out of the nozzle; a quick setting agent being added within the nozzle assembly or upstream of the nozzle just prior to passage into the nozzle. There are also examples of this system where the cement composition can be pumped, rather than pneumatically conveyed, to a point midway between the point of mixing and the nozzle in the delivery hose followed by pneumatic conveying between this midpoint and nozzle. The system allows good control of W/C ratio and generates little dust.

Pressures employed in the pneumatic delivery of cement compositions in shotcreting generally range from 60 to 140 psi, and are more usually 80 to 120 psi.

A particularly useful method of employing the quick-setting agents of the present invention in shotcreting is to add less than an accelerating amount of a water-soluble salt of malic or citramalic acid initially upon batching of the cementitious composition and then to add an additional accelerating amount of the water-soluble salt of malic acid or citramalic acid in the vicinity of the nozzle, such as described in the copending application, U.S. Ser. No. (Attorney Docket No.154-0271), filed on the same date as the present application.

If desired, a rheology modifying material capable of imparting thixotropic properties to the cementitious composition may be added as described in the aforementioned U.S. Patent, Ser. No. (Attorney Docket No.154-0271).

The following examples merely demonstrate the invention and are not intended to limit the same. In the examples, setting time and compressive strength measurements conform to American Society for Testing and Materials Methods C 266 and C 109, respectively. All measurements were made at room temperature. In the examples set times are determined from the time the malate or citramalate is mixed with the cement.

EXAMPLE 1

In a plastic bag, 2775 g of mortar mix (dry ingredients), which consists of 740 g of ordinary portland cement and 2035 g of silica sand, was blended together. To this mix, 333 g of mixing water will be added. Approximately 50% of the mixing water was placed in the mixing bowl of a Hobart lab mixer. The blended dry ingredients were then added. 44.4 g of dipotassium malate (6% by weight of cement) was dissolved in the remaining mix water and added into the mixing bowl. The mortar was then mixed for three minutes. The test specimens were then cast immediately and determined to have the following properties:

Initial setting time: 7 minutes
Final setting time: 9 minutes

| Compressive Strength PSI (MPa): |              |
| ------------------------------- | ------------ |
| 1 hour                          | 673 (4.64)   |
| 4 hour                          | 1525 (10.52) |
| 1 day                           | 2739 (18.89) |
| 7 day                           | 4411 (30.42) |

EXAMPLE 2

A mortar mix prepared in strict accord with ASTM C109 was prepared to contain 8.5% dipotassium malate based on the weight of the cement at a water to cement ratio of 0.45 and was determined to have the following properties:

Initial setting time: 4 minutes
Final setting time: 6.5 minutes

| Compressive Strength PSI (MPa): |              |
| ------------------------------- | ------------ |
| 1 hour                          | 863 (5.95)   |
| 4 hour                          | 1840 (12.69) |
| 1 day                           | 3040 (20.97) |
| 7 day                           | 4081 (28.14) |

EXAMPLE 3

A mortar mix was prepared in strict accord with ASTM C109 and contained 8% sodium citramalate based on the weight of cement at a water to cement ratio of 0.40 and was determined to have the following set times:

Initial set: 3 minutes
Final set: 5 minutes

We claim:

1. A quick setting cementitious mixture useful for shotcreting applications comprising a calcium alumino-silicate mineral blend, wherein said calcium alumino-silicate mineral blend is a hydraulic cement, a water soluble malate or water soluble citramalate, said malate or citramalate being present in an amount effective to accelerate the set of the cementitious mixture, said effective amount being at least 5.5% by weight based on the total weight of the calcium alumino-silicate mineral blend.

2. A composition of claim 1 which includes water for the hydraulic setting time of the cementitious mixture.

3. A composition of claim 2 in which the water soluble malate or citramalate is an alkali metal malate or alkali metal citramalate.

4. A composition of claim 3 in which the alkali metal malate is dipotassium malate.

5. A composition of claim 1 in which aggregate is included in a weight ratio of aggregate to the calcium alumino-silicate mineral blend in the range of from 1.2:1 to 5:1.

6. A composition of claim 5 in which the aggregate consists of fine aggregate.

7. A composition of claim 1 in which the malate or citramalate is present in an amount of 5.5% to 8.5% by weight based on the total weight of the calcium alumino-silicate mineral blend.

8. A rapid-setting cementitious composition for use in shotcreting applications consisting essentially of a calcium alumino-silicate mineral blend, wherein said calcium alumino-silicate mineral blend comprises hydraulic cement; a water soluble malate or water soluble citramalate, said malate or citramalate being present in an amount effective to accelerate the set time of the calcium alumino-silicate cementitious mineral blend, said effective amount being at least 5.5% by weight based on the total weight of the calcium alumino-silicate cementitious mineral blend; water; and optionally at least one additional component selected from the group consisting of aggregate, silica fume, silicones, fibers, bonding/cohesive agents, and mixtures thereof.

9. The composition of claim 8 in which the water soluble malate or water soluble citramalate is an alkali metal malate or alkali metal citramalate.

10. The composition of claim 9 in which the alkali metal malate is selected from the group consisting of dipotassium malate, dipotassium citramalate, disodium malate, disodium citramalate, dilithium malate, and dilithium citramalate.

11. The composition of claim 8 in which aggregate is included in a weight ratio of aggregate to calcium alumino-silicate cementitious mineral blend in the range of 1.2:1 to 5:1.

12. The composition of claim 11 in which the aggregate consists of fine aggregate.

13. The composition of claim 8 in which the malate or citramalate is present in an amount of 5.5% to 8.5% by weight of the calcium alumino-silicate cementitious mineral blend.

* * * * *